US012424181B2

(12) United States Patent
Qiu

(10) Patent No.: US 12,424,181 B2
(45) Date of Patent: Sep. 23, 2025

(54) MAGNETIC-FLUID DISPLAY APPARATUS WITH PICKUP FUNCTION

(71) Applicant: Ceyu Qiu, Guangdong (CN)

(72) Inventor: Ceyu Qiu, Guangdong (CN)

( * ) Notice: Subject to any disclaimer, the term of this patent is extended or adjusted under 35 U.S.C. 154(b) by 0 days.

(21) Appl. No.: 18/131,313

(22) PCT Filed: Jan. 25, 2022

(86) PCT No.: PCT/CN2022/073885

§ 371 (c)(1),
(2) Date: Apr. 5, 2023

(87) PCT Pub. No.: WO2023/141786

PCT Pub. Date: Aug. 3, 2023

(65) Prior Publication Data

US 2024/0363083 A1 Oct. 31, 2024

(51) Int. Cl.
*G09G 3/34* (2006.01)

(52) U.S. Cl.
CPC .................................. *G09G 3/3486* (2013.01)

(58) Field of Classification Search
CPC .................................................... G09G 3/3486
See application file for complete search history.

(56) References Cited

U.S. PATENT DOCUMENTS 10,644,539 B2 * 5/2020 Pivonka .................. H02J 50/80
2023/0188819 A1 * 6/2023 Files ...................... H04N 7/144 348/373
2023/0188839 A1 * 6/2023 Files ...................... H04N 23/60 348/207.99

FOREIGN PATENT DOCUMENTS

CN 202306913 U * 7/2012
CN 205943461 U * 2/2017
CN 109192148 A * 1/2019 ........... G09G 3/3406
CN 109640077 A * 4/2019
CN 107316546 B * 8/2019 ............. G09B 23/18
CN 115499734 A * 12/2022
CN 218570396 U * 3/2023
JP 2005091759 A * 4/2005
WO WO-2005094183 A2 * 10/2005 ....... G11B 20/10527

* cited by examiner

*Primary Examiner* — Ricardo Osorio
(74) *Attorney, Agent, or Firm* — Nitin Kaushik

(57) ABSTRACT

Provided is a magnetic-fluid display apparatus with a pickup function, the apparatus including a display container, a number of electromagnetic elements that control change of a magnetic field according to electrical signals, pickup devices, and a circuit board, where the display container is provided with a magnetic fluid, the magnetic fluid is located within a range of the magnetic field generated by the electromagnetic elements, and the electromagnetic elements and the pickup devices are both electrically connected with the circuit board. The magnetic-fluid display apparatus of the present invention has the pickup function, can directly control the change of the magnetic field according to surrounding sounds, can not only display according to playing of music, but also respond to the other sounds in an environment, and has a higher degree of freedom in use.

11 Claims, 6 Drawing Sheets

MAGNETIC-FLUID DISPLAY APPARATUS WITH PICKUP FUNCTION

TECHNICAL FIELD

The present invention relates to the field of magnetic-fluid display apparatuses, in particular to a magnetic-fluid display apparatus with a pickup function.

BACKGROUND

A magnetic fluid is also known as a magnetic liquid, a ferromagnetic fluid or a magnetic solution, is a new type of functional material, and has both fluidity of liquids and magnetic property of solid magnetic materials. The existing display apparatuses use a magnetic fluid as a display medium, and enable the magnetic fluid to display different shapes through change of a magnetic field.

At present, some products combine magnetic-fluid display with sound playing to realize a visual vocal effect, that is, the magnetic fluid changes the shape with change of a sound, for example, when music is played, the magnetic fluid changes into a corresponding shape with frequency or intensity of the music. A magnetic-fluid display device based on convergence and dispersion of a magnetic fluid and capable of displaying unique visual images, which is disclosed by the invention application CN110998700A in China, includes: a display part which includes a transparent liquid filled with the magnetic fluid; and a magnetic field generation part which is used for applying a magnetic field to the magnetic fluid behind the display part. If the magnetic field is applied, the magnetic fluid moves directionally in the transparent liquid to present the images in the display part.

However, most of the existing magnetic-fluid display apparatuses can only directly input electrical signals to control change of the magnetic field, so that the magnetic fluid can only change the shape with the electrical signals relative to predetermined audio, and can not respond to sounds around the apparatuses, and therefore, the apparatuses have a low degree of freedom in use.

SUMMARY

The technical solution of the present invention aims at the above situation and provides a magnetic-fluid display apparatus with a pickup function to solve the above problem, and the magnetic-fluid display apparatus includes: a display container, a number of electromagnetic elements that control change of a magnetic field according to electrical signals, pickup devices, and a circuit board, where the display container is provided with a magnetic fluid, the magnetic fluid is located within a range of the magnetic field generated by the electromagnetic elements, and the electromagnetic elements and the pickup devices are both electrically connected with the circuit board.

Further, the circuit board is provided with a control circuit, the control circuit includes: a processing module, a pickup module and an electromagnetic module, where the pickup module and the electromagnetic module are electrically connected with the processing module respectively, the pickup module filters, shapes and amplifies the electrical signals converted by the pickup devices, and judges intensity and frequency of sound signals, the processing module outputs an electrical signal for controlling the electromagnetic module according to the electrical signals amplified by the pickup module, and the electromagnetic module controls the electromagnetic elements according to the electrical signal output by the processing module.

Further, the magnetic-fluid display apparatus further includes: a base, where the pickup devices and the circuit board are both located inside the base, and the display container is located outside the base.

Further, the base includes: a shell body and a cover body, where a rear end of the shell body is provided with an opening, the cover body includes: a support and a back plate, where the support is fixed to the back plate, the support is located outside the shell body, the electromagnetic elements are located on the support, and the back plate covers the opening in the rear end of the shell body.

Further, the shell body is provided with a location groove, and the display container and the support are both located in the location groove.

Further, the magnetic-fluid display apparatus further includes: a power supply, a switch and a charging interface, where the power supply, the switch and the charging interface are all electrically connected with the circuit board.

Further, the control circuit further includes: a power supply module and an on-off module, where the power supply module and the on-off module are electrically connected with the processing module sequentially, the power supply module transmits power of the power supply, and the on-off module cooperates with the switch to realize a power on-off function.

Further, light sources are arranged in the support.

Further, the control circuit further includes: a light module, where the light module is electrically connected with the processing module, the processing module outputs an electrical signal for controlling the light module according to the electrical signals amplified by the pickup module, and the light module controls the light sources according to the electrical signal output by the processing module.

Further, the processing module includes: a microprocessor, a first voltage-stabilizing circuit and a simulation single-chip microcomputer, where a power input circuit is electrically connected with the microprocessor through the first voltage-stabilizing circuit, the microprocessor is electrically connected with the light module, the simulation single-chip microcomputer is electrically connected with the microprocessor, and the microprocessor is electrically connected with the pickup module.

Further, the power supply module includes: a charging management chip, a fuse, a filtering circuit and a second voltage-stabilizing circuit, where the charging interface is electrically connected with the filtering circuit through the fuse, the filtering circuit is electrically connected with the charging management chip, and the power supply is electrically connected with the charging management chip through the second voltage-stabilizing circuit.

Further, the on-off module includes: a voltage stabilizer, a switch circuit and a voltage detection circuit, where the switch circuit is electrically connected with the switch, the power supply is electrically connected with the switch circuit, and the switch circuit and the voltage detection circuit are electrically connected with the voltage stabilizer sequentially.

Further, the pickup module includes: an amplifier-comparator and a filtering-shaping circuit, where the pickup devices are electrically connected with the filtering-shaping circuit, the filtering-shaping circuit is electrically connected with the amplifier-comparator, and the amplifier-comparator is electrically connected with the microprocessor.

Further, the electromagnetic module includes: a voltage-regulating circuit, a voltage-boosting circuit and an electromagnetic conversion circuit, where the voltage-regulating circuit and the voltage-boosting circuit are electrically connected with the electromagnetic conversion circuit sequentially, the microprocessor is electrically connected with the voltage-regulating circuit, the microprocessor is electrically connected with the electromagnetic conversion circuit, and the electromagnetic conversion circuit is electrically connected with the electromagnetic elements.

Further, the light module includes: a third voltage-stabilizing circuit, a first light control circuit, a second light control circuit and a third light control circuit, where the first light control circuit, the second light control circuit and the third light control circuit are all electrically connected with the third voltage-stabilizing circuit, there are three light sources, and the first light control circuit, the second light control circuit and the third light control circuit are electrically connected with the three light sources respectively. After the above technical solution is adopted, the effects of the present invention are as follows:

1. The magnetic-fluid display apparatus of the present invention can control the shape change of the magnetic fluid through the change of the magnetic field, realize a dynamic display function, and can be displayed as an ornament.
2. The magnetic-fluid display apparatus of the present invention has the pickup function, and can directly control the change of the magnetic field according to the surrounding sounds, and has a higher degree of freedom in use compared with display apparatuses that directly input specific electrical signals in the prior art.

DETAILED DESCRIPTION OF THE EMBODIMENTS

In particular, in the description of the present invention, "a plurality of" means at least two, such as two, three, etc., unless otherwise specifically defined; and "a number of" means at least one. In the examples of the present invention, all directional indications (such as top, bottom, left, right, front, rear, etc.) are merely used for explaining the relative position relationship, movement conditions, etc. among the components in a specific attitude, and if the specific attitude changes, the directional indications change accordingly.

The technical solution of the present invention is further described as follows through the examples:

Example 1

Figure 1:
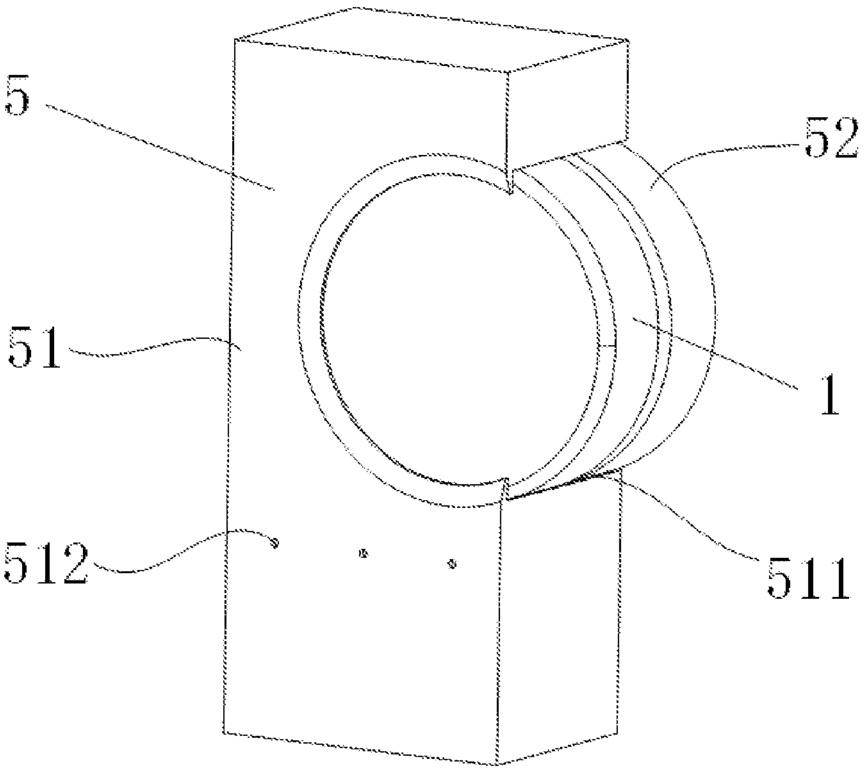
FIG. 1 is a schematic diagram of a magnetic-fluid display apparatus in an example 1 of the present invention.
Figure 2:
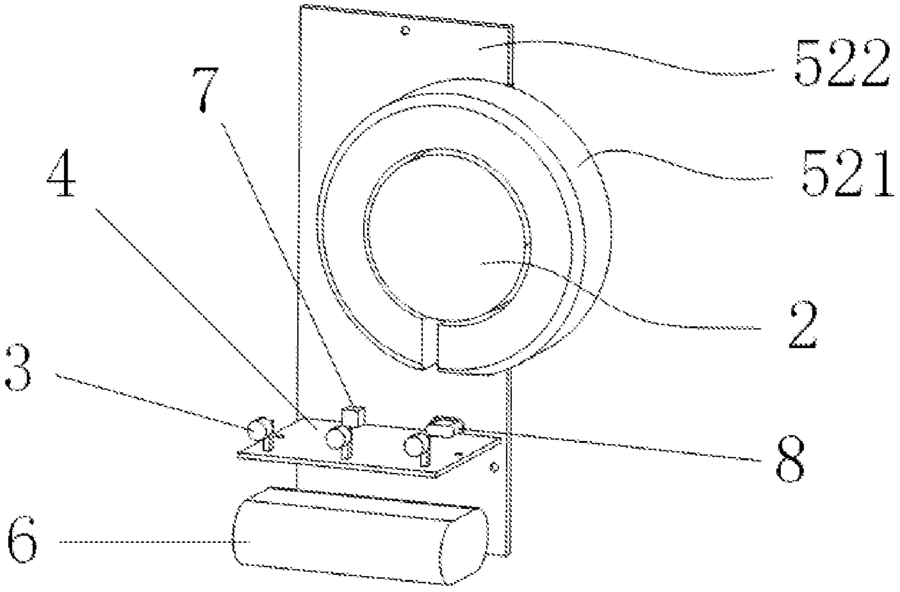
FIG. 2 is an internal view of a magnetic-fluid display apparatus in the example 1 of the present invention.

The present invention provides a magnetic-fluid display apparatus with a pickup function, as shown in FIG. 1 and FIG. 2, the magnetic-fluid display apparatus includes: a display container 1, a number of electromagnetic elements 2 that control change of a magnetic field according to electrical signals, pickup devices 3, and a circuit board 4, where the display container 1 is provided with a magnetic fluid, the magnetic fluid is located within a range of the magnetic field generated by the electromagnetic elements 2, and the electromagnetic elements 2 and the pickup devices 3 are both electrically connected with the circuit board 4.

When the magnetic-fluid display apparatus works, the pickup devices 3 receive surrounding sound waves and convert sound signals into electrical signals, the electrical signals are transmitted to the electromagnetic elements 2 through the circuit board 4, the electromagnetic elements 2 convert the electrical signals into a magnetic field, magnetic induction intensity of the magnetic field where the magnetic fluid is located is related to intensity of the electrical signals, and a function of controlling magnetic-fluid display through pickup is realized.

A transparent liquid filled with the magnetic fluid may be arranged inside the display container 1. The magnetic fluid may be formed by dispersing magnetite particles in an organic solvent of an oily substance; and the transparent liquid may be one or a mixture of more of water, ethanol and isopropanol. The above material is similar to those selected in the prior art, and the properties will not be described in detail here.

In the example, electromagnets are used as the electromagnetic elements 2, and the electromagnets change the magnetic induction intensity of the magnetic field generated by the electromagnets according to the intensity of the electrical signals, so that the magnetic induction intensity of the position where the magnetic fluid is located changes. Certainly, in other implementation manners, the electromagnetic elements 2 may also include: a movement mechanism and a permanent magnet, where the permanent magnet is arranged on the movement mechanism, and the movement mechanism changes a position of the permanent magnet according to the intensity of the received electrical signals, so that the magnetic induction intensity of the position where the magnetic fluid is located changes (referring to a magnetic-fluid control apparatus for magnetic-fluid display, which is disclosed by the invention patent CN213990468U in China for details).

Different from the prior art, the magnetic-fluid display apparatus of the present invention can change the magnetic field according to the frequency or intensity of the surrounding sounds, so that display of the magnetic fluid may be freely controlled. Specifically, if the magnetic-fluid display apparatus is placed in an environment with playing of music, naturally, the magnetic-fluid display apparatus displays a shape change process of the magnetic fluid according to the playing of the music, and an electrical signal related to the music has no need to be input; when the magnetic-fluid display apparatus enters different music environments, the shape change process of the magnetic fluid is different; and more importantly, sounds of footsteps, sounds of people speaking, sounds of movements or collisions of objects, and the like, can all change the shape of the magnetic fluid, so that a visual effect of the environmental sounds is realized, and a high degree of freedom in use is achieved.

In the example, there is one electromagnetic element 2, and the magnetic fluid changes the shape according to the change of the magnetic field generated by the electromagnetic element 2.

Specifically, the magnetic-fluid display apparatus further includes: a base 5, where the pickup devices 3 and the circuit board 4 are both located inside the base 5, and the display container 1 is located outside the base 5. The base 5 can achieve a protecting effect on the pickup devices 3 and the circuit board 4.

More specifically, the base 5 includes: a shell body 51 and a cover body 52, where a rear end of the shell body 51 is provided with an opening (not shown in the figures), the cover body 52 includes: a support 521 and a back plate 522, the support 521 is fixed to the back plate 522, the support 521 is located outside the shell body 51, the electromagnetic elements 2 are located on the support 521, and the back plate 522 covers the opening in the rear end of the shell body 51.

More specifically, light sources (not shown in the figures) are arranged in the support 521. The visual effect may be improved through lighting of the light sources.

More specifically, the shell body 51 is provided with a location groove 511, where the display container 1 and the support 521 are both located in the location groove 511. A user may assemble and disassemble the display container 1 from the location groove 511 for replacement or adjustment.

More specifically, the shell body 51 is provided with pickup holes 512, and the pickup devices 3 are directly opposite to the pickup holes 512. The sounds around the magnetic-fluid display apparatus pass through the pickup holes 512 and then are received by the pickup devices 3, and compared with a fully-sealed shell body, a sound reception effect can be improved through the formation of the pickup holes 512.

More specifically, there are a plurality of the pickup devices 3 and a plurality of the pickup holes 512. In the example, there are three pickup devices 3 and three pickup holes 512, and the three pickup devices 3 are equally spaced in the form of a row. The sound reception effect can be further improved through the arrangement of the three pickup devices 3.

More specifically, the magnetic-fluid display apparatus further includes: a power supply 6, a switch 7 and a charging interface 8, where the power supply 6, the switch 7 and the charging interface 8 are all electrically connected with the circuit board 4. The power supply 6 is used for supplying power to the circuit board 4; the switch 7 is used for realizing turning-on and turning-off of the magnetic-fluid display apparatus; and the charging interface 8 is used for charging the power supply 6.

More specifically, the back plate 522 is provided with a switch hole and a charging hole, the power supply 6 is located inside the base 5, the switch 7 passes through the switch hole, and the charging interface 8 is directly opposite to the charging hole.

Figure 3:
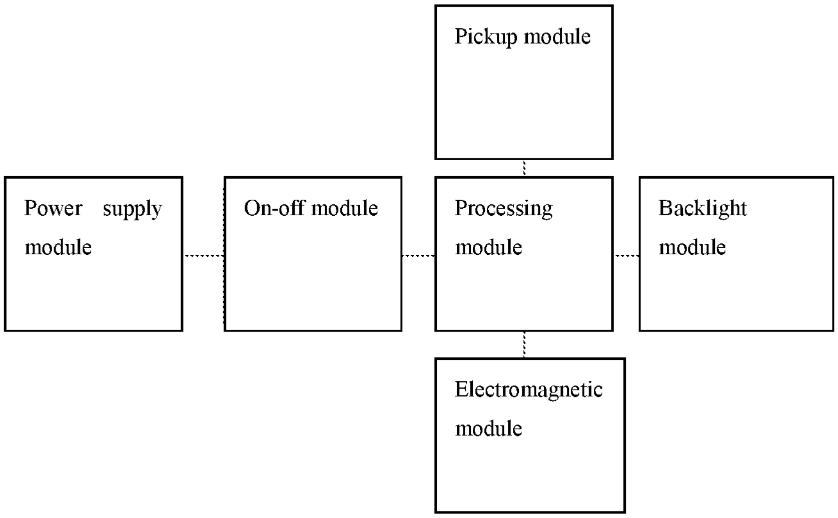
FIG. 3 is a principle block diagram of a control circuit in the example 1 of the present invention.

Specifically, as shown in FIG. 3, the circuit board 4 is provided with a control circuit, the control circuit includes: a processing module, a power supply module, an on-off module, a pickup module, an electromagnetic module and a light module, where the power supply module and the on-off module are electrically connected with the processing module sequentially, the pickup module, the electromagnetic module and the light module are electrically connected with the processing module respectively, the power supply module transmits power of the power supply 6, the on-off module cooperates with the switch 7 to realize a power on-off function, the pickup module filters, shapes and amplifies the electrical signals converted by the pickup devices 3, and judges intensity and frequency of sound signals, the processing module outputs electrical signals for controlling the electromagnetic module and the light module according to the electrical signals amplified by the pickup module, the electromagnetic module controls the electromagnetic elements 2 according to the electrical signal output by the processing module, and the light module controls the light sources according to the electrical signal output by the processing module.

Figure 4:
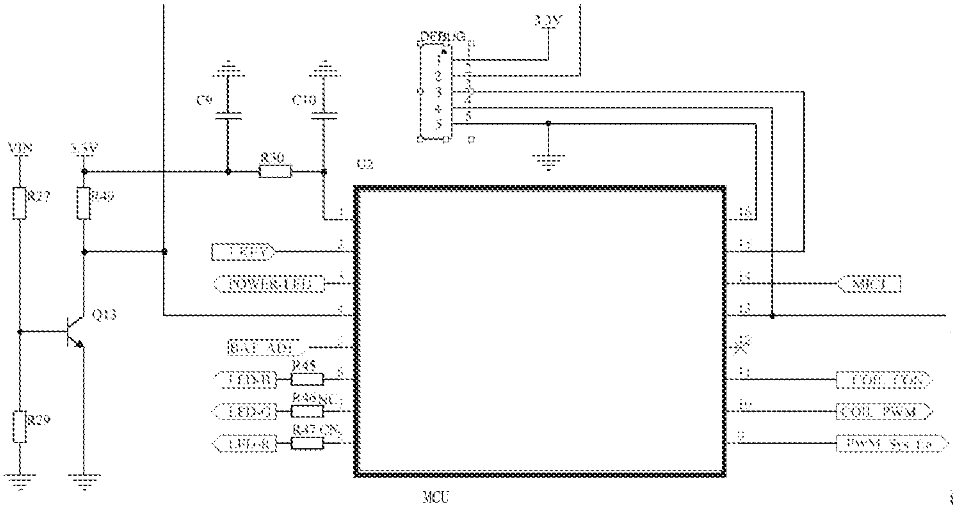
FIG. 4 is a circuit diagram of a processing module in the example 1 of the present invention.

More specifically, as shown in FIG. 4, the processing module includes: a microprocessor MCU, a resistor R27, a resistor R29, a triode Q13, a resistor R49, a resistor R30, a capacitor C9, a capacitor C10, a resistor R45, a resistor R46, a resistor R47 and a simulation single-chip microcomputer DEBUG, where the resistor R27, the resistor R29, the triode Q13 and the resistor R49 form a power input circuit, the resistor R30, the capacitor C9 and the capacitor C10 form a first voltage-stabilizing circuit, the power input circuit is electrically connected with a pin 1 (power supply pin) of the microprocessor MCU through the first voltage-stabilizing circuit, the resistor R45, the resistor R46 and the resistor R47 are electrically connected with pins 6 to 8 (light pins) of the microprocessor MCU respectively, and are all electrically connected with the light module, pins 2 to 5 of the simulation single-chip microcomputer DEBUG are electrically connected with pins 13 to 16 of the microprocessor MCU respectively, and a pin 14 of the microprocessor MCU is electrically connected with the pickup module. An STM32 ADC microprocessor may be used as the microprocessor MCU, the microprocessor MCU is used for outputting a control signal according to a result of judging the intensity and frequency of the sound signals by the pickup module, the power input circuit is used for transmitting the power input by the on-off module, the first voltage-stabilizing circuit is used for achieving a voltage-stabilizing effect, and the simulation single-chip microcomputer DEBUG is used for debugging the microprocessor MCU.

Figure 5:
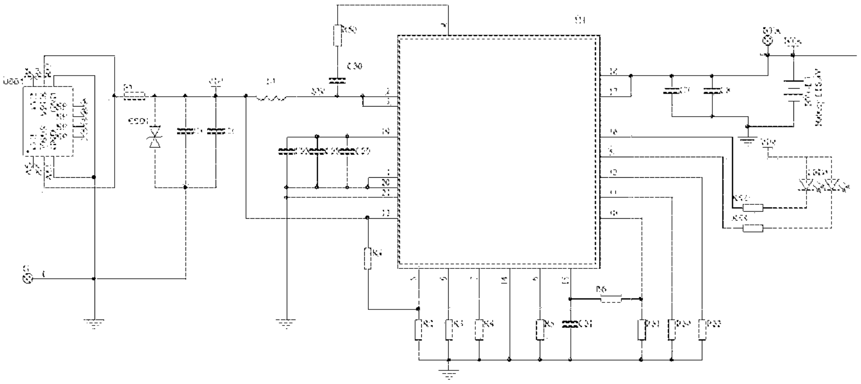
FIG. 5 is a circuit diagram of a power supply module in the example 1 of the present invention.

More specifically, as shown in FIG. 5, the power supply module includes: a charging management chip U1, a fuse F1, an electrostatic diode ESD, a capacitor C1, a capacitor C2, an inductor L1, a capacitor C23, a capacitor C28, a capacitor C29, a capacitor C30, a capacitor C31, a resistor R50, a resistor R1, a resistor R2, a resistor R3, a resistor R4, a resistor R5, a resistor R6, a resistor R51, a resistor R52, a resistor R53, a resistor R54, a resistor R55, two indication lamps LED1, a capacitor C7 and a capacitor C8, where the electrostatic diode ESD, the capacitor C1, the capacitor C2 and the inductor L1 form a filtering circuit, the charging interface 8 is electrically connected with the filtering circuit through the fuse F1, the filtering circuit is electrically connected with pins 2 to 3 of the charging management chip U1, the capacitor C30 is connected in series with the resistor R50, the capacitor C30 is electrically connected with the pins 2 to 3 of the charging management chip U1, the resistor R50 is electrically connected with a pin 4 of the charge management chip U1, one end of the capacitor C23, one end of the capacitor C28 and one end of the capacitor C29 are all electrically connected with a pin 19 of the charging management chip U1, the other end of the capacitor C23, the other end of the capacitor C28 and the other end of the capacitor C29 are all electrically connected with pins 1 and 20 of the charging management chip U1, the both ends of the resistor R1 are electrically connected with pins 8 and 13 of the charging management chip U1 respectively, the resistor R5, the resistor R4, the resistor R2, the resistor R3, the resistor R51, the resistor R54 and the resistor R55 are electrically connected with pins 6 to 12 of the charging management chip U1 respectively, the both ends of the resistor R6 are electrically connected with pins 10 and 15 of the charging management chip U1 respectively, the capacitor C31 is electrically connected with the pin 15 of the charging management chip U1, one indication lamp LED1 is electrically connected with a pin 16 of the charging management chip U1 through the resistor R52, the other indication lamp LED1 is electrically connected with a pin 5 of the charging management chip U1 through the resistor R53, the capacitor C7 and the capacitor C8 form a second voltage-stabilizing circuit, and the power supply 6 is electrically connected with pins 17 and 18 of the charging management chip U1 through the second voltage-stabilizing circuit. A MAX1772 charging management chip may be used as the charging management chip U1, the charging management chip U1 is used for monitoring a charging condition, the charging interface 8 inputs power to the charging management chip U1 through the filtering circuit, and the charging management chip U1 inputs the power to the power supply 6, and the second voltage-stabilizing circuit achieves a voltage-stabilizing effect; the two indication lamps LED1 are used for indicating an electric quantity; and if in the case of a short circuit, the fuse F1 is disconnected, so that charging is stopped.

Figure 6:
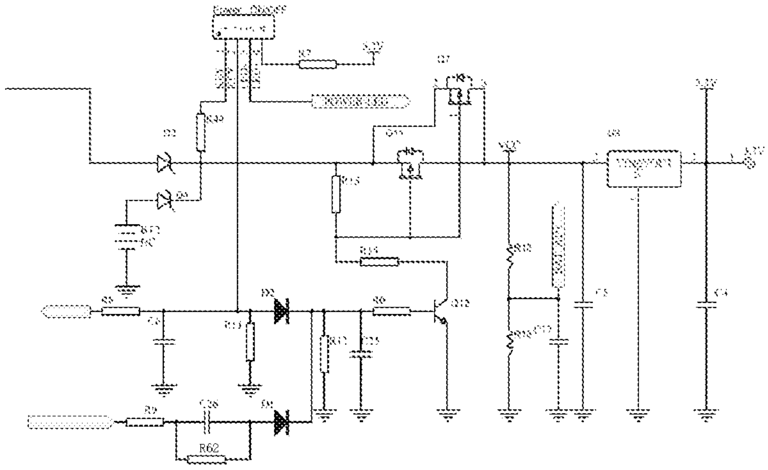
FIG. 6 is a circuit diagram of an on-off module in the example 1 of the present invention.

More specifically, as shown in FIG. 6, the on-off module includes: a voltage stabilizer U3, a resistor R8, a resistor R9, a capacitor C6, a capacitor C26, a resistor R62, a resistor R11, a diode D1, a diode D2, a resistor R12, a capacitor C25, a resistor R0, a triode Q12, a resistor R13, a resistor R14, a triode Q11, a triode Q7, a diode D3, a diode D4, a resistor R44, a resistor R7, a resistor R15, a resistor R16, a capacitor C17, a capacitor C5 and a capacitor C4, where the resistor R8, the resistor R9, the capacitor C6, the capacitor C26, the resistor R62, the resistor R11, the diode D1, the diode D2, the resistor R12, the capacitor C25, the resistor R0, the triode Q12, the resistor R13, the resistor R14, the triode Q11 and the triode Q7 form a switch circuit, the switch circuit is electrically connected with a pin 1 of the switch 7 through the resistor R44, the resistor R7 is electrically connected with a pin 4 of the switch 7, the diode D4 is electrically connected with the switch circuit, the power supply 6 is electrically connected with the switch circuit through the diode D3, the resistor R15, the resistor R16 and the capacitor C17 form a voltage detection circuit, the switch circuit, the voltage detection circuit and the capacitor C5 are electrically connected with a pin 2 of the voltage stabilizer U3 sequentially, and the capacitor C4 is electrically connected with a pin 3 of the voltage stabilizer U3. A CE3206A voltage stabilizer may be used as the voltage stabilizer U3, the switch 7 controls on-off of the power transmission through the switch circuit, the voltage detection circuit is used for detecting a voltage of the power supply 6, and the voltage stabilizer U3 achieves a voltage-stabilizing effect according to the voltage change of the power supply 6.

Figure 7:
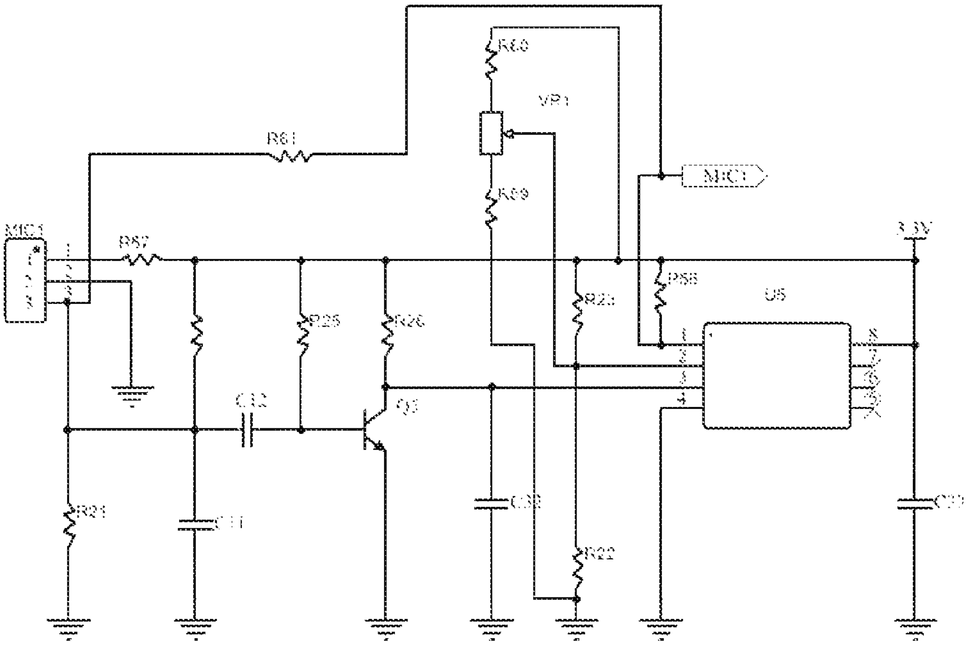
FIG. 7 is a circuit diagram of a pickup module in the example 1 of the present invention.

More specifically, as shown in FIG. 7, the pickup module includes: an amplifier-comparator U5, a resistor R21, a resistor R57, a capacitor C11, a capacitor C12, a resistor R61, a resistor R25, a resistor R26, a triode Q5, a capacitor C32, a resistor R59, a resistor R60, a sliding rheostat VR1, a resistor R22, a resistor R23, a resistor R58 and a capacitor C33, where the resistor R21, the resistor R57, the capacitor C11, the capacitor C12, the resistor R61, the resistor R25, the resistor R26, the triode Q5, the capacitor C32, the resistor R59, the resistor R60, the sliding rheostat VR1, the resistor R22 and the resistor R23 form a filtering-shaping circuit, the pickup devices 3 are electrically connected with the filtering-shaping circuit, the filtering-shaping circuit is electrically connected with pins 2 to 3 of the amplifier-comparator U5, the resistor R58 is electrically connected with a pin 1 of the amplifier-comparator U5, the pin 1 of the amplifier-comparator U5 is electrically connected with a pin 14 of the microprocessor MCU, and the capacitor C33 is electrically connected with a pin 8 of the amplifier-comparator U5. An LM358 amplifier-comparator may be used as the amplifier-comparator U5, the electrical signals converted by the pickup devices 3 may be filtered and shaped through the filtering-shaping circuit, the filtered-shaped signals are amplified by the amplifier-comparator U5, and the intensity and frequency of the sound signals are judged through comparison.

Figure 8:
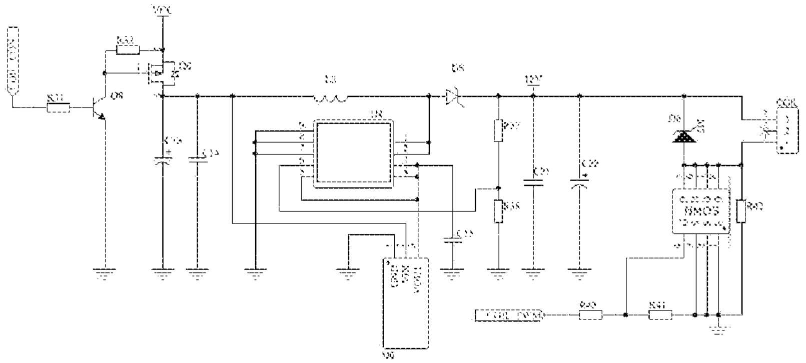
FIG. 8 is a circuit diagram of an electromagnetic module in the example 1 of the present invention.

More specifically, as shown in FIG. 8, the electromagnetic module includes: a power amplifier U4, a voltage stabilizer U6, a resistor R31, a resistor R32, a triode Q6, a triode Q8, a capacitor C13, a capacitor C14, an inductor L2, a diode D5, a capacitor C15, a resistor R37, a resistor R38, a capacitor C21, a capacitor C22, a chip MOS transistor (NMOS), a diode D6, a resistor R41 and a resistor R43, where the resistor R31, the resistor R32, the triode Q6, the triode Q8, the capacitor C13, the capacitor C14 and the inductor L2 form a voltage-regulating circuit, a pin 2 of the voltage stabilizer U6 is electrically connected with a pin 6 of the power amplifier U4, a pin 3 of the voltage stabilizer U6 is electrically connected with pins 3 to 5 of the power amplifier U4, the power amplifier U4, the diode D5, the capacitor C15, the resistor R37, the resistor R38, the capacitor C21 and the capacitor C22 form a voltage-boosting circuit, the chip MOS transistor, the diode D6, the resistor R41 and the resistor R43 form an electromagnetic conversion circuit, the voltage-regulating circuit and the voltage-boosting circuit are electrically connected with the electromagnetic conversion circuit sequentially, a pin 11 of the microprocessor MCU is electrically connected with the voltage-regulating circuit, a pin 10 of the microprocessor MCU is electrically connected with the electromagnetic conversion circuit, and the electromagnetic conversion circuit is electrically connected with the electromagnetic elements 2. A TDA1521 power amplifier may be used as the power amplifier U4, a TO220 voltage stabilizer may be used as the voltage stabilizer U6, the voltage-regulating circuit is used for controlling a signal for output of the voltage-boosting circuit, the voltage-boosting circuit is used for boosting the voltage, the voltage stabilizer U6 achieves a voltage-stabilizing effect on the power amplifier U4, and the electromagnetic conversion circuit is used for transmitting the power to the electromagnetic elements 2.

Figure 9:
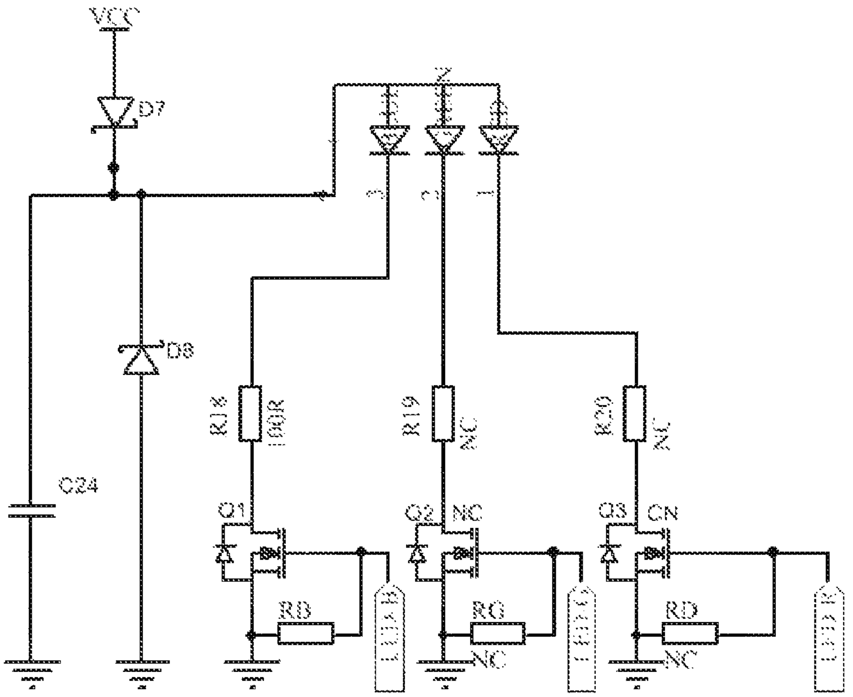
FIG. 9 is a circuit diagram of a light module in the example 1 of the present invention.

Specifically, as shown in FIG. 9, the light module includes: a capacitor C24, a diode D7, a diode D8, a triode Q1, a triode Q2, a triode Q3, a resistor RB, a resistor RG, a resistor RD, a resistor R18, a resistor R19 and a resistor R20, where the capacitor C24, the diode D7 and the diode D8 form a third voltage-stabilizing circuit, the triode Q1, the resistor RB and the resistor R18 form a first light control circuit, the triode Q2, the resistor RG and the resistor R19 form a second light control circuit, the triode Q3, the resistor RD and the resistor R20 form a third light control circuit, and the first light control circuit, the second light control circuit and the third light control circuit are all electrically connected with the third voltage-stabilizing circuit, and are electrically connected with the three light sources respectively. In the example, the three light sources are a blue LED lamp, a green LED lamp and a red LED lamp respectively, and the blue lamp, the green lamp and the red lamp may be controlled to emit lights through the first light control circuit, the second light control circuit and the third light control circuit.

Example 2

Figure 10:
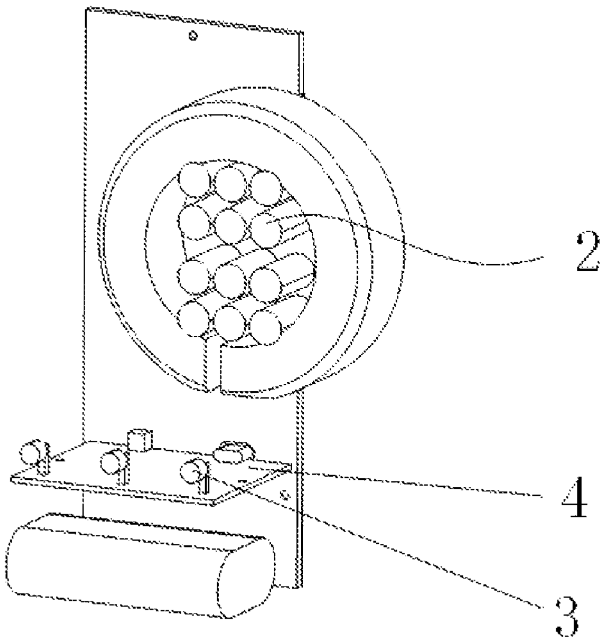
FIG. 10 is a schematic diagram of a magnetic-fluid display apparatus according to an embodiment 2 of the present invention.

In the example, as shown in FIG. 10, the structure of the magnetic-fluid display apparatus is similar to that in the example 1, and different from the example 1, there are a plurality of the electromagnetic elements 2, and the plurality of electromagnetic elements 2 are arranged in the form of a rectangular array. The circuit board 4 may change the magnetic field of the different electromagnetic elements 2 according to the change of the surrounding sounds, and single-point control over the magnetic field is realized, so that the shape of the magnetic fluid is controlled and displayed more accurately.

It is worth mentioning that, for the plurality of electromagnetic elements 2 in the above arrangement form, the electromagnetic elements 2 in each row may correspond to sound signals in a frequency band, and frequency of the sounds acquired by the pickup devices 3 is judged through the pickup module, the processing module outputs a corresponding modulation signal to the electromagnetic module according to the frequency of the sounds and by using the pin 11 of the microprocessor MCU, and the electromagnetic elements 2 in the corresponding row are controlled by the electromagnetic module to generate a magnetic field; and similarly, intensity of the sounds acquired by the pickup devices 3 is judged through the pickup module, the processing module outputs a corresponding modulation signal to the electromagnetic module according to the intensity of the sounds and by using the pin 10 of the microprocessor MCU, and the electromagnetic module controls the number of the electromagnetic elements 2 that generate the magnetic field in the row according to the modulation signal, so that different shapes of the magnetic fluid are generated.

Example 3

Figure 11:
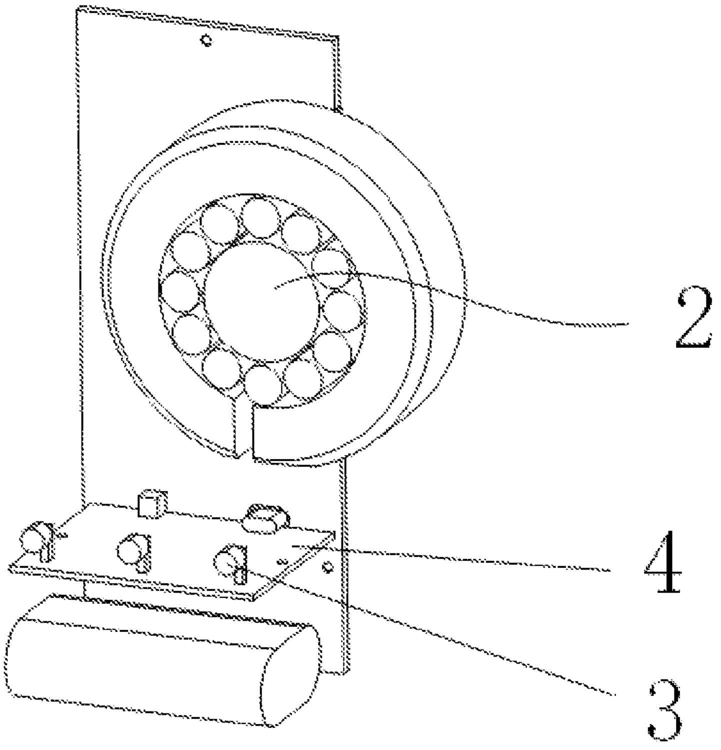
FIG. 11 is a schematic diagram of a magnetic-fluid display apparatus in an example 3 of the present invention.

In the example, as shown in FIG. 11, the structure of the magnetic-fluid display apparatus is similar to that in the example 2, and different from the example 2, the plurality of electromagnetic elements 2 are arranged in the form of a multi-layer circular array.

In the example, the plurality of electromagnetic elements 2 are arranged in the form of a two-layer circular array (that is, only one electromagnetic element 2 is arranged in the middle of the electromagnetic elements 2 in the outer circle), while in the other implementation manners, the plurality of electromagnetic elements 2 may also be arranged in the form of a circular array of three or more layers (that is, three or more circles of the electromagnetic elements 2 are arranged).

It is worth mentioning that, for the plurality of electromagnetic elements 2 in the above arrangement form, the electromagnetic elements 2 in each radius may correspond to sound signals in a frequency band, and frequency of the sounds acquired by the pickup devices 3 is judged through the pickup module, the processing module outputs a corresponding modulation signal to the electromagnetic module according to the frequency of the sounds and by using the pin 11 of the microprocessor MCU, and the electromagnetic elements 2 in the corresponding radius are controlled by the electromagnetic module to generate a magnetic field; and similarly, intensity of the sounds acquired by the pickup devices 3 is judged through the pickup module, the processing module outputs a corresponding modulation signal to the electromagnetic module according to the intensity of the sounds and by using the pin 10 of the microprocessor MCU, and the electromagnetic module controls the number of the electromagnetic elements 2 that generate the magnetic field in the radius according to the modulation signal, so that different shapes of the magnetic fluid are generated.

Specifically, the display container 1 and the support 521 are both flat cylindrical, and the display container 1 is directly opposite to the support 521. The plurality of electromagnetic elements 2 which are arranged in the form of a circular array can better fill the entire support 521, and make full use of space inside the support 521, so that multi-point control over the magnetic fluid is realized.

The above examples are merely better examples of the present invention and are not intended to limit the scope of implementation of the present invention, therefore, any equivalent changes or modifications made according to the structure, features and principles described in the scope of patent application for the present invention should be included in the scope of patent application for the present invention.

What is claimed is:

1. A magnetic-fluid display apparatus with a pickup function, comprising a display container, a number of electromagnetic elements that control change of a magnetic field according to electrical signals, pickup devices, and a circuit board, wherein the display container is provided with a magnetic fluid, the magnetic fluid is located within a range of the magnetic field generated by the electromagnetic elements, and the electromagnetic elements and the pickup devices are both electrically connected with the circuit board, wherein the circuit board is provided with a control circuit, the control circuit comprises: a processing module, a pickup module and an electromagnetic module, the pickup module and the electromagnetic module are electrically connected with the processing module respectively, the pickup module filters, shapes and amplifies the electrical signals converted by the pickup devices, and judges intensity and frequency of sound signals, the processing module outputs an electrical signal for controlling the electromagnetic module according to the electrical signals amplified by the pickup module, and the electromagnetic module controls the electromagnetic elements according to the electrical signal output by the processing module, wherein the pickup devices and the circuit board are both located inside he base and the display container is located outside the base, wherein the base comprises: a shell body and a cover body, wherein a rear end of the shell body is provided with an opening, the cover body comprises, a support and a back plate, the support is fixed to the back plate, the support is located outside the shell body, the electromagnetic elements are located on the support, and the back plate covers the opening in the rear end of the shell body;

wherein the shell body is provided with a location groove, and the display container and the support are both located in the location groove.

2. The magnetic-fluid display apparatus with the pickup function of claim 1, further comprising: a power supply, a switch and a charging interface, wherein the power supply, the switch and the charging interface are all electrically connected with the circuit board.

3. The magnetic-fluid display apparatus with the pickup function of claim 2, wherein the control circuit further comprises: a power supply module and an on-off module, wherein the power supply module and the on-off module are electrically connected with the processing module sequentially, the power supply module transmits power of the power supply, and the on-off module cooperates with the switch to realize a power on-off function.

4. The magnetic-fluid display apparatus with the pickup function of claim 3, wherein light sources are arranged in the support.

5. The magnetic-fluid display apparatus with the pickup function of claim 4, wherein the control circuit further comprises: a light module, the light module is electrically connected with the processing module, the processing module outputs an electrical signal for controlling the light module according to the electrical signals amplified by the pickup module, and the light module controls the light sources according to the electrical signal output by the processing module.

6. The magnetic-fluid display apparatus with the pickup function of claim 5, wherein the processing module comprises: a microprocessor, a first voltage-stabilizing circuit and a simulation single-chip microcomputer, a power input circuit is electrically connected with the microprocessor through the first voltage-stabilizing circuit, the microprocessor is electrically connected with the light module, the simulation single-chip microcomputer is electrically connected with the microprocessor, and the microprocessor is electrically connected with the pickup module.

7. The magnetic-fluid display apparatus with the pickup function of claim 5, wherein the power supply module comprises: a charging management chip, a fuse, a filtering circuit and a second voltage-stabilizing circuit, the charging interface is electrically connected with the filtering circuit through the fuse, the filtering circuit is electrically connected with the charging management chip, and the power supply is electrically connected with the charging management chip through the second voltage-stabilizing circuit.

8. The magnetic-fluid display apparatus with the pickup function of claim 5, wherein the on-off module comprises: a voltage stabilizer, a switch circuit and a voltage detection circuit, the switch circuit is electrically connected with the switch, the power supply is electrically connected with the switch circuit, and the switch circuit and the voltage detection circuit are electrically connected with the voltage stabilizer sequentially.

9. The magnetic-fluid display apparatus with the pickup function of claim 5, wherein the pickup module comprises: an amplifier-comparator and a filtering-shaping circuit, the pickup devices are electrically connected with the filtering-shaping circuit, the filtering-shaping circuit is electrically connected with the amplifier-comparator, and the amplifier-comparator is electrically connected with the microprocessor.

10. The magnetic-fluid display apparatus with the pickup function of claim 5, wherein the electromagnetic module comprises: a voltage-regulating circuit, a voltage-boosting circuit and an electromagnetic conversion circuit, the voltage-regulating circuit and the voltage-boosting circuit are electrically connected with the electromagnetic conversion circuit sequentially, the microprocessor is electrically connected with the voltage-regulating circuit, the microprocessor is electrically connected with the electromagnetic conversion circuit, and the electromagnetic conversion circuit is electrically connected with the electromagnetic elements.

11. The magnetic-fluid display apparatus with the pickup function of claim 5, wherein the light module comprises: a third voltage-stabilizing circuit, a first light control circuit, a second light control circuit and a third light control circuit, the first light control circuit, the second light control circuit and the third light control circuit are all electrically connected with the third voltage-stabilizing circuit, there are three light sources, and the first light control circuit, the second light control circuit and the third light control circuit are electrically connected with the three light sources respectively.

* * * * *